United States Patent [19]

Pecha

[11] 4,025,371
[45] May 24, 1977

[54] WELDING CONTAINERS

[75] Inventor: Ernst Pecha, Nuertingen, Germany

[73] Assignee: Bielomatik Leuze & Co., Germany

[22] Filed: Mar. 1, 1976

[21] Appl. No.: 662,395

[30] Foreign Application Priority Data

Mar. 8, 1975 Germany .......................... 2510258

[52] U.S. Cl. ..................................... 156/64; 73/40;
429/90; 156/356; 156/378; 156/381;
264/40.1; 29/623.2
[51] Int. Cl.² ........................................ G01D 7/00
[58] Field of Search ............ 156/64, 378, 381, 382,
156/356, 285; 136/175, 182, 170, 176;
73/49.2, 40; 264/40

[56] References Cited

UNITED STATES PATENTS

| 3,177,702 | 4/1965 | Anderson | 73/40 |
| 3,460,310 | 8/1969 | Adcock et al. | 156/69 |
| 3,529,463 | 9/1970 | Orlando et al. | 73/49.2 |
| 3,808,073 | 4/1974 | Navarre | 156/64 |

Primary Examiner—Edward G. Whitby
Attorney, Agent, or Firm—Steele & Petock

[57] ABSTRACT

A welding apparatus for welding covers to containers, such as battery casings by pressing the cover on to the casing is provided with a testing device which includes a connector adjacent the pressing-on device and adapted to connect with an opening in the cover. The testing device is adapted to monitor the pressure inside the container after the latter has been charged with fluid under pressure at the end of the welding operation. Any fall in pressure is indicative of a leak at the welded seam.

12 Claims, 1 Drawing Figure

U.S. Patent May 24, 1977 4,025,371
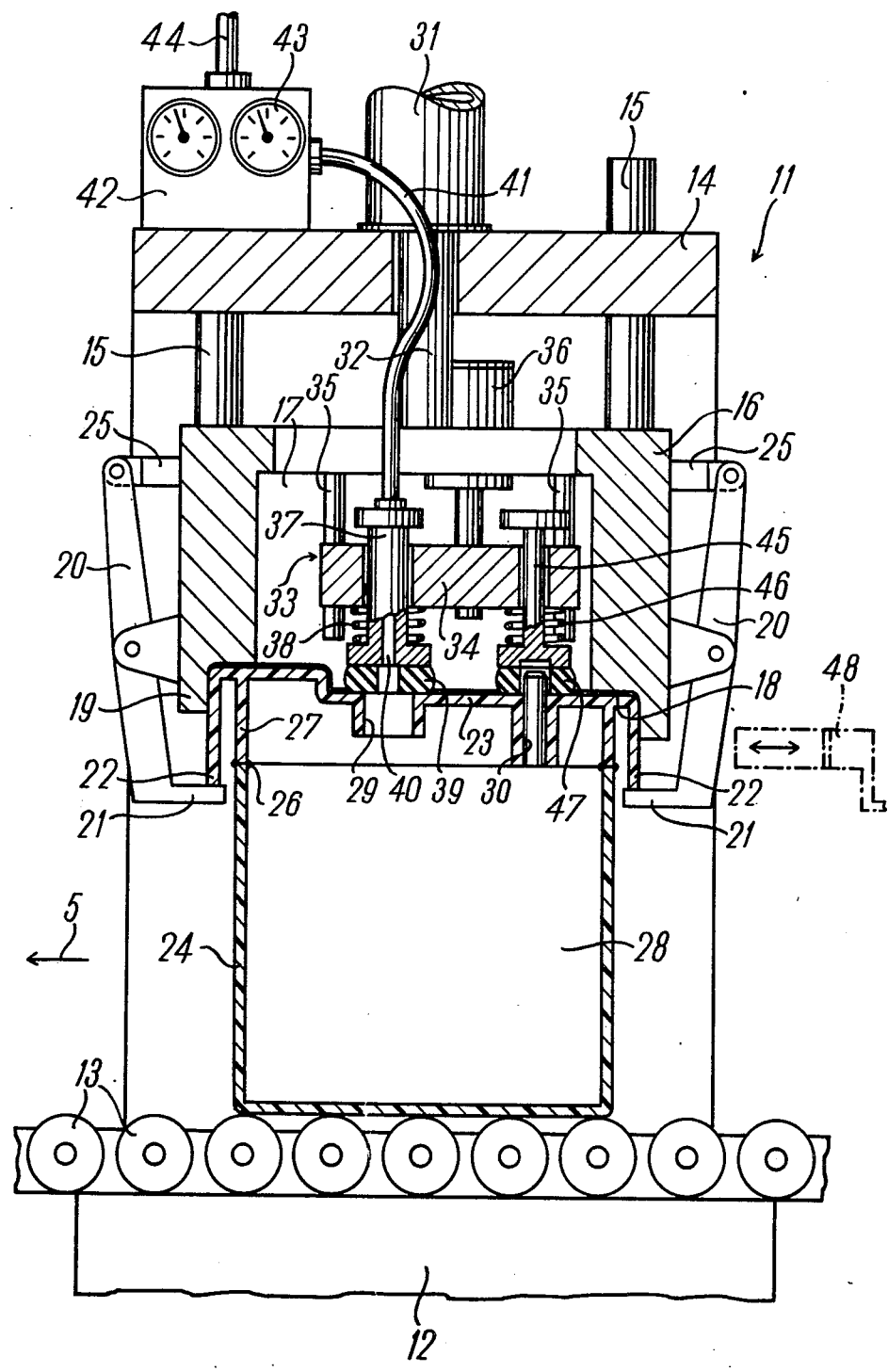

WELDING CONTAINERS

The invention relates to an apparatus and method for welding covers to containers, such as battery casings made from plastics material.

Battery casings, particularly for lead accumulators, are normally made from plastics material and, after the plates forming the electrodes have been inserted, have their covers, which are also made from plastics material welded thereto. This is effected on a welding machine which operates with a welding tool which is introduced between the container and the cover and heats the two surfaces to be welded. After the welding tool has been removed, the cover and the container are pressed together and are thereby welded. After welding and cooling, the containers are conveyed out of the welding machine and, inter alia, are conveyed to a testing machine where the weld is tested under pressure for leaks. Thus, two different machines and two different working operations are required for welding and testing.

A feature of the invention is to provide welding apparatus which does not require a separate testing machine.

In accordance with the invention, apparatus for welding covers to containers comprises a device for pressing the covers on the containers to weld the covers to the containers and a pressure connector arranged in the region of the pressingon device and connectible to at least an opening in the cover, said pressure connector leading to pressure responsive means for testing the container for leaks under pressure.

In a preferred embodiment, the pressure connector is connectible to a source of pressure medium immediately after the welding operation. Furthermore, preferably, testing for leaks may be carried out whilst the pressing-on device is pressing the cover against the container. Thus, in addition to providing a substantial simplification from a mechanical point of view by virtue of the fact that there is no need to provide a separate testing machine and testing can be carried out in practice by an attachment for the pressing-on device which is in any case provided, the station time for the welding operation is not substantially prolonged, since at least a portion of the cooling time which is, in any case, required for the welded seam, can be used whilst the testing operation is being undertaken. This also produces the desired secondary effect of cooling the interior of the container by the filling of the container with the pressure medium, preferably compressed air.

Advantageously, the pressure connector includes connection heads provided with pressure medium supply lines and with seals for abutment against the cover. Furthermore, closure members may be provided on the pressure connector to cooperate with additional openings in the cover for the purpose of sealing such openings. These closure members are provided, since, in battery casings, each cell may have two cover openings, namely a filling opening for the battery acid and a connection opening through which a terminal pin extends. One of the openings is then closed, whilst the other is used to fill the container with pressure medium.

Preferably, the pressure connector includes several individually sprung connection heads and/or closure members, the number of which are preferably equal to the number of cells which are to be individually tested. Preferably, the connection heads and/or closure members are pressed on simultaneously, although they can be acted upon by pressure medium at different times in order, for example, to also test for leaks between the individual cells of the battery.

The pressure connector may be pressable against the cover by an actuating device independently of the pressing-on device. This feature is advantageous since, during the welding operation, the cover is not additionally stressed by the contact pressure of the connection heads or closure members, which might lead to deformation. The pressure connector can then be pressed against the cover only after the welding operation, i.e. at the commencement of the cooling phase. However, it is also possible to press the pressure connector against the cover together with the pressing-on device, i.e. before the welding operation. This simplifies the construction and can be done when there is no risk of distortion of the cover in the case of, for example, very small or very strong battery casings.

The invention includes a method of testing containers to which covers are welded on a welding machine in which the welded containers are charged with fluid under pressure whilst they are still on the welding machine and the pressure in the pressurized containers is monitored to detect any pressure loss due to leakage at the weld.

The invention is further described, by way of example, with reference to the accompanying drawing. The FIGURE is a diagrammatic longitudinal section through a welding apparatus in accordance with the invention.

The welding apparatus 11 has a machine frame 12 having a roller table 13 on which containers 24, to which covers 23 are to be welded, are movable in the direction of the arrow 5. The upper portion of the machine frame 12 is formed by a transverse bridge 14 having guideways for vertical guide columns 15 which form part of a pressing-on device 16. The pressing-on device 16 is in the form of a frame having a central opening 17 and, on its lower side, a pressure shoulder 18. A guide spigot 19 extends around the pressure shoulder 18. Two-armed retaining levers 20 are hinged to the outside of the pressing-on device 16 and their bottom ends have retaining fingers 21 which can engage under an external and bottom edge 22 of the cover 23 which is to be welded onto the container 24. The top free ends of the retaining levers 20 are displaceable, by way of bars 25 by means of an actuating device (not illustrated), such as an hydraulic or pneumatic cylinder, mounted on the pressing-on device, between the position (shown in the drawing) in which the cover is held and a position in which the retaining fingers 21 release the edge 22 of the cover.

The cover has a generally dished configuration, so that the welded seam 26 is located in the region of the vertical walls of the container. The welded seam is overlapped externally by the edge 22 which is formed on the cover at a distance from the vertical walls of the container and parallel thereto and which extends somewhat lower than the side wall portion 27 of the cover 23. The container and its cover form the casing of an electrical battery, such as a lead accummulator. Accordingly, both the container and the cover have a plurality of transverse walls 28 which separate the individual cells of the battery. The welded seam 26 also extends across the transverse partition walls. The cover has two connections per cell, namely a central filling opening 29 and a lateral connection opening 30 through which the electrical terminal pin extends. In the case of batteries having an internal connection through the transverse partition walls, at least one cell is located in the centre and has only one opening. The openings are surrounded, and thus reinforced, by connection sleeves which are formed interiorly.

The pressing-on device 16 is movable in a vertical direction by way of a piston rod 32 by means of an actuating device 31, such as a pneumatic cylinder, mounted on the bridge 14.

A pressure connector 33 is arranged in an opening 17 formed in the pressing-on device 16. The pressure connector has a carrier 34 which is guided by guide columns 35 mounted on the pressing-on device 16. The carrier 34 is displaceable in a vertical direction relatively to the pressing-on device by means of an actuating device 36 such as a pneumatic or hydraulic cylinder.

Connection heads 37 are guided in the carrier 34 so as to be movable in a vertical direction. The connection heads 37 are in the form of hollow plungers which are resiliently urged towards their lower end position by means of springs 38. The bottom surface of each connection head 37 is widened in a flange-like manner and is provided with a seal 39 which, in the illustrated embodiment, rests on the edge region surrounding the opening 29 of the cover 23 and acts as a surface seal.

A pressure medium passage 40 extends through the connection head 37 and its top end is connected to a flexible tube 41 for pressure medium. The flexible tube 41 leads to a testing device 42 having pressure meters 43 and a pressure medium feed pipe 44. Several connection heads 37 are located one behind the other on the carrier 34 at right angles to the plane of the drawing. Preferably, their flexible tubes for pressure medium are connected to the same testing device. The testing device includes automatically operated valves, such as solenoid valves, through which, for example, compressed air can be fed from a compressed air supply in a controlled manner to the individual connection heads or a group thereof.

Furthermore, closure members 45 are provided on the carrier 34 and are in the form of plungers which are guided in vertical guide bores in the carriers 34 and which have a flange at each end. The closure members 45 are also biased towards their lower end positions by means of springs 46. Their bottom surfaces are also provided with a seal 47 which can rest on the edge region of the bore 30. However, the sealing elements 45 do not have any pressure medium passages.

A welding tool 48 having mirror-like heating surfaces is indicated by dash-dot lines in the drawing and, by means not illustrated, may be moved in a horizontal direction indicated by arrows into a position between the container and the cover and retracted therefrom.

The described apparatus operates in the following manner:

The containers 24, that is to say, the cup-shaped bottom parts, travel on the roller table 13 into the illustrated welding position. In this connection, it may be mentioned that, before the welding operation, the container has already been filled with the electrode plates which, however, have not been illustrated for the purpose of simplifying the drawing. The cover can already have been placed onto the container, or, alternatively, it may be conveyed to the pressing-on device 16 independently. In any case, the pressing-on device 16 grips the cover between the pressing-on shoulder 18 and the retaining fingers 21 in the manner which is illustrated and which has been described. The pressure connector 33 is still held in its raised position by the actuating device 36, so that the seals 39, 47 are not resting on the cover.

The pressing-on device 16 is then raised into its upper position (not illustrated) by the actuating device 31, and the welding tool 48 is moved into position between the edges of the container 24 and cover 23 which are to be welded to one another. The cover is then again lowered somewhat, so that the edges to be welded to one another are heated and plasticized by the mirror-like heating surfaces. The welding tool can operate with contact or radiation heat transfer from its heating surfaces.

The welding tool is then retracted and the pressing-on device 16 is moved into the illustrated position together with the cover held thereby, so that the pressure shoulders 18 press the cover onto the container and thus press the plasticized edges together to form the welded seam 26.

After the welding operation has been effected, the pressure connector 33 is moved downwardly by means of the actuating device 36, so that the seals 39 and 47 on the connection heads 37 and on the sealing elements 45 are applied to the top of the cover and seal the interior of the container with the exception of the pressure medium passage 40. The independent, resilient movability of the connection heads 37 and the sealing elements 47 ensure satisfactory abutment of the seals.

The interior of the container is then pressurized by way of the flexible tubes 41. Testing is effected by using the measuring devices 43 to monitor the pressure in the individual cells to ascertain whether there is any inadmissable drop in pressure after the supply of pressurized fluid is switched off. Any type of conventional measuring or monitoring devices can be used for this purpose. Preferably, testing is effected in two stages, three cells not adjacent to one another being pressurized simultaneously in each stage, in the case of a six cell battery.

Thus it is possible to dispense with the independent testing machine without virtually any change in the station time at the welding machine. The filling of the interior of the container with compressed air can commence during the cooling of the welded seam immediately following the welding operation. No high pressures exist during the initial phase of the filling operation, so that there is no risk of impairing the fresh weld. However, if the welding operation should be effected so badly that even the low initial pressure of the air charge blows through the welded seam, this is desirable and provides an additional margin of safety for the tightness of the container.

A large number of modifications of the illustrated apparatus are possible within the scope of the invention. It has already been mentioned that it is not always necessary for the pressure connector to be independently movable by means of the actuating device 36. Alternatively, the pressure connector might be guided on the transverse bridge 14. However, it would then have to be designed for extremely large strokes. It would also be possible to actuate the individual connection heads and sealing elements independently of one another, or to move the two groups independently in two working steps during a measurement. However, this would increase the expenditure on mechanical parts. A plug-shaped seal, which permits sealing with a low contact pressure, may be used instead of the flat or annular seal 39 which is illustrated. It is also conceivable to guide the pressing-on device 16 on the pressure connector 33, in contrast to the reverse arrangement of the described embodiment.

It is particularly advantageous to relieve the pressing-on device 16 by the actuating device 31 after welding has been effected, thus ensuring that, during the pressurizing operation, the tightness of the container is produced only by the weld and not by the pressing-on of the cover by means of the pressing-on device. Owing to the resilient pressing-on of the elements 37 and 45, the sealing of the openings is then unaffected.

I claim:

1. Apparatus for welding covers to containers, said covers having at least one opening therein, which apparatus comprises:
   means for pressing the covers onto the containers and for forming a weld seam therebetween;
   pressure monitoring means; and
   pressure connection means arranged in the region of said pressing-on means for connecting said monitoring means to said cover opening for testing the container for leaks under pressure while said container remains in said welding apparatus.

2. Apparatus according to claim 1, including a source of pressure medium which is connectable to the pressure connector means.

3. Apparatus for welding covers to containers having at least one opening therein, which apparatus comprises:
   means for pressing said covers onto said containers and for forming a weld seam therebetween;
   pressure monitoring means; and
   pressure connector means arranged in the region of said pressing-on means for connecting said monitoring means to said cover opening for testing the container for leaks under pressure whilst the pressing-on means is pressing the cover against the container.

4. Apparatus according to claim 3, in which said pressure connector means includes at least one connection head which is provided with a pressure medium supply line and seal means for abutment against the cover.

5. Apparatus according to claim 1, further comprising at least one closure member connected to said pressure connector means, said at least one closure member adapted to cooperate with an additional opening in the cover for the purpose of sealing the cover.

6. Apparatus according to claim 4 in which the pressure connector means has a plurality of individually sprung mounted connection heads, for directing said pressure medium to a plurality of openings in said containers.

7. Apparatus according to claim 5 in which the pressure connector means is further provided with a plurality of individually sprung mounted closure members, for sealing a plurality of openings in said containers.

8. Apparatus according to claim 3, further comprising an actuating device for pressing the pressure connector means against the cover independently of said pressing-on means.

9. Apparatus according to claim 4 further comprising a carrier on which said at least one connection head is arranged, said carrier being separate from said pressing-on means and being movable relative thereto.

10. Apparatus according to claim 9 including means guidably supporting the carrier on said pressing-on means and an actuating device effective between said carrier and said pressing-on means for pressing said pressure connector means against said cover.

11. A method of welding covers to containers and testing the weld, comprising the steps of:
    utilizing pressing-on means to press a cover onto a container;
    welding a seam therebetween;
    pressurizing the welded container whilst the pressing-on means is still in its pressing-on position;
    connecting pressure monitoring means to the pressurized container; and
    observing the pressure in the container to detect any pressure drop therein, said pressure drop being indicative of a leak at the welded seam.

12. A method according to claim 11 in which the pressurizing of the container is commenced directly after the seam has been welded.

* * * * *